United States Patent
Brown et al.

(10) Patent No.: US 10,509,307 B2
(45) Date of Patent: Dec. 17, 2019

(54) HIGH CONTRAST, GLASS-BASED, WRITEABLE/ERASABLE FRONT PROJECTION SCREENS

(71) Applicant: CORNING INCORPORATED, Corning, NY (US)

(72) Inventors: Gordon Charles Brown, Corning, NY (US); Jacques Gollier, Redmond, WA (US); Joan Deanna Gregorski, Painted Post, NY (US); Vasudha Ravichandran, Painted Post, NY (US); David Lee Weidman, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/329,803

(22) PCT Filed: Jul. 28, 2015

(86) PCT No.: PCT/US2015/042374
§ 371 (c)(1),
(2) Date: Jan. 27, 2017

(87) PCT Pub. No.: WO2016/018861
PCT Pub. Date: Feb. 4, 2016

(65) Prior Publication Data
US 2017/0269466 A1    Sep. 21, 2017

Related U.S. Application Data

(60) Provisional application No. 62/030,833, filed on Jul. 30, 2014.

(51) Int. Cl.
*G03B 21/56*    (2006.01)
*B43L 1/12*    (2006.01)
(Continued)

(52) U.S. Cl.
CPC ............ *G03B 21/56* (2013.01); *B32B 17/061* (2013.01); *B43L 1/12* (2013.01); *G03B 21/60* (2013.01); *B32B 2559/00* (2013.01)

(58) Field of Classification Search
CPC ...... G03B 21/62; G03B 21/56; B32B 17/061; B32B 2559/00
(Continued)

(56) References Cited

U.S. PATENT DOCUMENTS 3,067,530 A    12/1962  Bolsey
3,844,644 A *  10/1974  Martinez ................ G03B 21/60
                                                      24/462
(Continued)

FOREIGN PATENT DOCUMENTS

CN         2542455 Y      4/2003
CN         201931848      8/2011
(Continued)

OTHER PUBLICATIONS

Caulfield, John, H. "Designing the 'perfect' projection screen", Optics and Laser Technology Elsevier, Jul. 21, 2003, pp. 1-3.
(Continued)

*Primary Examiner* — Christopher E Mahoney

(57) ABSTRACT

High contrast, glass-based, writeable/erasable front projection screens are provided. The screens include a transparent glass sheet which has a front surface and a back surface separated by a distance d. The back surface is in optical contact with a diffusing element. During use of the projection screen, the glass sheet transmits image light from a projector to the diffusing element and the diffusing element reflects a portion of that light back through the glass sheet to a user. The screens have a user-facing surface that is a writable/erasable surface. In embodiments, the distance d is less than or equal to 0.2 millimeters, the whiteness W of the
(Continued)

projection screen is less than or equal to 0.5, and/or the contrast C of the projection screen is at least 75%.

18 Claims, 6 Drawing Sheets

(51) Int. Cl.
*G03B 21/60* (2014.01)
*B32B 17/06* (2006.01)

(58) Field of Classification Search
USPC .................................................. 359/452, 461
See application file for complete search history.

(56) References Cited

U.S. PATENT DOCUMENTS

| | | | |
|---|---|---|---|
| 5,010,671 A * | 4/1991 | Stonehouse | G09F 1/10 281/15.1 |
| 5,200,853 A | 4/1993 | Berkman | |
| 5,361,164 A * | 11/1994 | Steliga | B43L 1/004 359/455 |
| 5,374,595 A | 12/1994 | Dumbaugh, Jr. et al. | |
| 6,319,867 B1 | 11/2001 | Chacon et al. | |
| 6,476,965 B1 | 11/2002 | He | |
| RE37,920 E | 12/2002 | Moffatt et al. | |
| 7,534,734 B2 | 5/2009 | Ellison | |
| RE41,127 E | 2/2010 | Kohli | |
| 7,833,919 B2 | 11/2010 | Danielson et al. | |
| 7,851,394 B2 | 12/2010 | Ellison | |
| 8,158,543 B2 | 4/2012 | Dejneka et al. | |
| 8,220,932 B2 | 7/2012 | Liu | |
| 8,223,180 B2 | 7/2012 | Elliott et al. | |
| 2003/0123032 A1 * | 7/2003 | Rodriguez, Jr. | G03B 21/10 353/74 |
| 2005/0000642 A1 * | 1/2005 | Everaerts | C09J 7/0242 156/273.1 |
| 2006/0073466 A1 * | 4/2006 | Solomon | B43L 1/12 434/408 |
| 2006/0152834 A1 | 7/2006 | Kah et al. | |
| 2010/0171929 A1 * | 7/2010 | Liu | G03B 21/56 353/29 |
| 2011/0045961 A1 | 2/2011 | Dejneka et al. | |
| 2011/0091860 A1 * | 4/2011 | Supera | B32B 37/182 434/409 |
| 2011/0201490 A1 | 8/2011 | Barefoot et al. | |
| 2013/0337198 A1 * | 12/2013 | Ueda | B43L 1/04 428/12 |
| 2014/0154661 A1 * | 6/2014 | Bookbinder | B43L 1/002 434/408 |
| 2015/0152558 A1 * | 6/2015 | Walther | C03C 17/42 428/216 |
| 2017/0044058 A1 * | 2/2017 | Janiaud | C03B 19/06 |

FOREIGN PATENT DOCUMENTS

| | | |
|---|---|---|
| EP | 1630596 A1 | 1/2006 |
| JP | 2003237295 A | 8/2003 |
| JP | 2003270726 A | 9/2003 |
| JP | 2008139570 A | 6/2008 |
| JP | 2013019886 A | 1/2013 |
| TW | M388018 U | 9/2010 |
| WO | 2013177782 A1 | 12/2013 |
| WO | 2014166082 A1 | 10/2014 |

OTHER PUBLICATIONS

Notification of Transmittal of the International Search Report and Written Opinion of the International Searching Authority, or the Declaration, dated Jul. 28, 2015 pp. 1-10, International Application No. PCT/US2015/042374, European Patent Office, The Netherlands.
English Translation of CN201580041835.4 Second Office Action dated Jan. 4, 2019, China Patent Office, 12 Pgs.
English Translation of TW104124580 Office Action and Search Report dated Feb. 27, 2019, Taiwan Patent Office, 3 Pgs.
English Translation of JP2017504809 Office Action dated Jun. 26, 2019; 5 Pages; Japanese Patent Office.

* cited by examiner

HIGH CONTRAST, GLASS-BASED, WRITEABLE/ERASABLE FRONT PROJECTION SCREENS

CROSS-REFERENCE TO RELATED APPLICATIONS

This application claims the benefit of priority under 35 U.S.C. § 371 of International Application No. PCT/US2015/042374, filed on Jul. 28, 2015, which claims the benefit of priority under 35 U.S.C. § 119 of U.S. Provisional Application Ser. No. 62/030,833, filed on Jul. 30, 2014, the content of each of which is relied upon and incorporated herein by reference in its entirety.

FIELD

This disclosure relates to front projection screens which are also writable/erasable marker boards (also known as whiteboards or dry erase boards). The screens are constructed from glass sheets and, in preferred embodiments, achieve contrast levels of at least 75%.

Definitions

As used herein, the contrast in percent of a projection screen is the value obtained by evaluating the following equation:

$$C=100*(I_{max}-I_{min})/(I_{max}+I_{min})\%  \quad \text{Eq. (1)}$$

where $I_{max}$ and $I_{min}$ are obtained using a projector having a 1080 pixel resolution in the vertical direction and the following experimental protocol:

(1) with extraneous light sources eliminated (e.g., room lights, window light, etc.), project an image onto the screen from the projector where:
  (a) the image is produced by turning all of the projector's pixels to white except one single horizontal line (the black line) where the pixels are set to zero; and
  (b) the distance between the projector and the front surface of the screen is selected so that the black line has a thickness of 1.77 mm at the front surface of the screen, i.e., the distance of the projector to the front surface of the screen produces a vertical size for the entire image of approximately 2 meters;
(2) photograph the image on the screen using a scientific camera that produces a pixelized, computer-readable record of the image, the photograph being taken with the camera's gamma correction turned off and the area of the image covered by a pixel of the computer-readable record being less than or equal to 100 mm²;
(3) analyze the computer-readable record produced by the scientific camera using image analysis software to determine numerical values corresponding to the maximum and minimum light intensities $I_{max}$ and $I_{min}$ detected by the camera; and
(4) evaluate Eq. (1) using the values of $I_{max}$ and $I_{min}$ so obtained.

White printer paper can be used as a control for the above experimental protocol and should give a C value of at least 95%.

As used herein, the whiteness of a projection screen is the value obtained by evaluating the following equation:

$$W=I_{screen}/I_{white}  \quad \text{Eq. (2)}$$

where $I_{white}$ and $I_{screen}$ are obtained using a projector that produces a white image and the following experimental protocol:

(1) with extraneous light sources eliminated (e.g., room lights, window light, etc.), project the white image onto a piece of white printer paper to produce an illuminated white area;
(2) photograph the illuminated white area using a scientific camera that produces a pixelized, computer-readable record of the image;
(3) analyze the computer-readable record produced by the scientific camera using image analysis software to determine a numerical value corresponding to the average light intensity $I_{white}$ (average grey level) detected by the camera;
(4) replace the white printer paper with the projection screen so that the illuminated white area falls on the screen;
(5) photograph the illuminated white area using the scientific camera to produce a pixelized, computer-readable record of the image;
(6) analyze the computer-readable record produced by the scientific camera using image analysis software to determine a numerical value corresponding to the average light intensity $I_{screen}$ (average grey level) detected by the camera;
(7) evaluate Eq. (2) using the values of $I_{white}$ and $I_{screen}$ so obtained.

BACKGROUND

Glass-based writeable/erasable marker boards are known in the art. See U.S. Publ. No. 2011/091860 (Supera et al.; 21 Apr. 2011), U.S. Publ. No. 2006/073466 (Solomon; 6 Apr. 2006), and CN 2542455 Y (2 Apr. 2003). Commercial embodiments of such marker boards have been able to provide users with the basic functionality of writability and erasability. However, these marker boards have not been able to function as projection screens. Indeed, their performance has been so poor that consumers have been advised against using glass-based writeable/erasable marker boards as projection screens.

The problem with the prior art boards has been contrast. In essence, the contrast has been so poor that using the board as a projection screen has detracted, rather than aided, in the communication of information to persons viewing the board. It should be noted that contrast is particularly important when projecting data because data is typically black characters and a white overall background and the features are small. The present disclosure addresses this long standing problem in the art and provides glass-based, writeable/erasable, front projection screens that exhibit high levels of contrast.

SUMMARY

In accordance with a first aspect, a projection screen (7) is disclosed having a user-facing surface (43) which faces a user during use of the projection screen, said projection screen comprising a transparent glass sheet (13) and a diffusing element (19, 31, 33) wherein:

(a) the glass sheet (13) has a front surface (15) and a back surface (17) separated by a distance d;
(b) the back surface (17) of the glass sheet (13) is in optical contact with the diffusing element (19, 31, 33), i.e., image light from a projector can reach the diffusing element through the back surface and light reflected from the diffusing element can enter back into the glass sheet through the back surface;

(c) during use of the projection screen (7), the front (15) and back (17) surfaces of the glass sheet (13) transmit image light from a projector (9) to the diffusing element (19, 31, 33) and the diffusing element (19, 31, 33) reflects a portion of that light back through the glass sheet (13) to a user;

(d) the distance d is greater than 0.05 millimeters and less than or equal to 0.2 millimeters; and (e) the user-facing surface (43) of the projection screen (7) is a writable/erasable surface.

In accordance with a second aspect, a projection screen (7) is disclosed having a user-facing surface (43) which faces a user during use of the projection screen (7), said projection screen comprising a transparent glass sheet (13) and a diffusing element (19, 31, 33) wherein:

(a) the glass sheet (13) has a front surface (15) and a back surface (17);

(b) the back surface (17) of the glass sheet (13) is in optical contact with the diffusing element (19, 31, 33), i.e., image light from a projector can reach the diffusing element through the back surface and light reflected from the diffusing element can enter back into the glass sheet through the back surface;

(c) during use of the projection screen (7), the front (15) and back (17) surfaces of the glass sheet (13) transmit image light from a projector (9) to the diffusing element (19, 31, 33) and the diffusing element (19, 31, 33) reflects a portion of that light back through the glass sheet (13) to a user;

(d) the glass sheet (13) and the diffusing element (19, 31, 33) together provide the projection screen (7) with a whiteness W that is less than or equal to 0.5, e.g., less than or equal to 0.4, less than or equal to 0.3, or less than or equal to 0.2; and (e) the user-facing surface (43) of the projection screen (7) is a writable/erasable surface.

In embodiments of the above aspects of the disclosure, the projection screen has a contrast of at least 75%, e.g., a contrast of at least 80%, at least 85%, at least 90%, or at least 95%.

The reference numbers used in the above summaries of the aspects of the invention are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as exemplified by the description herein. The accompanying drawings are included to provide a further understanding of the invention, and are incorporated in and constitute a part of this specification. It is to be understood that the various features of the invention disclosed in this specification and in the drawings can be used separately and in any and all combinations.

BRIEF DESCRIPTION OF THE DRAWINGS

FIGS. 5, 7, and 13-17 are not to scale.

Figure 1:
FIG. 1 illustrates the low level of contrast that would result if an existing glass-based writeable/erasable marker board were to be used as a front projection screen.

The reference numbers used in the figures refer to the following:

7 projection screen
9 projector
11 image light from projector
13 glass sheet
15 front surface of glass sheet
17 back surface of glass sheet
19 diffusing element
21 light reflected/scattered by diffusing element (initial reflection and scattering)
23 light reflected by front surface of glass sheet
25 light reflected by front surface of glass sheet and then re-reflected/re-scattered by diffusing element (secondary reflection and scattering)
27 nominal white part of image
29 nominal black part of image 31 diffusing element as coating on the back surface of the glass sheet
33 diffusing element as a sheet laminated to the back surface of the glass sheet
35 adhesive
37 backer
39 adhesive
41 anti-glare element
43 user-facing surface of projection screen

DETAILED DESCRIPTION

As discussed above, the present disclosure relates to high contrast, glass-based, writeable/erasable front projection screens 7. The screens 7 include a transparent glass sheet 13 which has a front surface 15 and a back surface 17 separated by a distance d. The back surface 17 is in optical contact with a diffusing element 19,31,33. During use of the projection screen 7, the glass sheet 13 transmits image light from a projector 9 to the diffusing element 19,31,33 and the diffusing element 19,31,33 reflects a portion of that light back through the glass sheet 13 to a user. The screens 7 have a user-facing surface 43 that is a writable/erasable surface. In embodiments, the distance d is less than or equal to 0.2 millimeters, the whiteness W of the projection screen 7 is less than or equal to 0.5, and/or the contrast C of the projection screen 7 is at least 75%.

FIG. 1 illustrates the type of low contrast that has plagued existing glass-based writeable/erasable marker boards. Following the procedures described above for determining contrast values, the image shown in FIG. 1 was generated by projecting a black line onto a sheet of glass whose back surface had been painted white. The glass sheet had a thickness of 0.7 mm and the black line had a thickness of 1.77 mm at the front surface of the glass sheet. FIG. 1 is a picture of the black line taken with a scientific camera with its gamma correction turned off Using the analysis procedures described above and Eq. (1) to calculate the contrast, a value of 43.4% was obtained for the image of FIG. 1.

Figure 2:
FIG. 2 illustrates the contrast exhibited by a sheet of white printer paper.

FIG. 2 shows the results obtained when the black line was projected onto a sheet of white printer paper instead of the glass sheet used in FIG. 1. In this case, the value of the contrast calculated with Eq. (1) was 97.7%. Thus, the glass sheet of FIG. 1 reduced the contrast by more than 50% thus making the image essentially unusable.

Figure 3:
FIGS. 3 and 4 illustrate the high levels of contrast exhibited by glass-based writeable/erasable marker boards constructed in accordance with embodiments of the present disclosure. These contrast levels are substantially higher than that of FIG. 1 and are comparable to that of FIG. 2.
Figure 4:
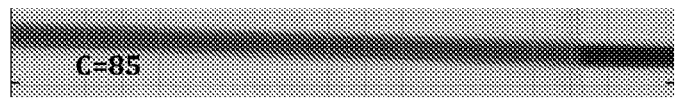

FIGS. 3 and 4 shows the results obtained when the black line was projected onto glass sheets which, in accordance with the present disclosure, had thicknesses d that were less than or equal to 0.2 millimeters. Specifically, in FIG. 3, the glass sheet had a thickness of 0.1 mm, while in FIG. 4, it had a thickness of 0.2 mm. As in FIG. 1, the back surfaces of these glass sheets had been painted white before the experiment was conducted. The calculated contrast values from Eq. (1) for the FIG. 3 and FIG. 4 screens were 95.7% and 85%, respectively, each value being sufficiently high for viewing under normal ambient light conditions.

In accordance with the disclosure, it has been determined that the contrast exhibited by glass-based, writeable/readable marker boards can be analyzed by treating the glass sheet as a waveguide and the diffusing element, e.g., white paint in intimate contact with the back surface of the glass sheet, as a Lambertian diffuser. A Lambertian diffuser scatters light in all directions and as a result, part of the light is scattered at angles larger than the total internal reflection angle in the glass. This light is "wave-guided" in the glass and propagates on for some distance. As a result, as will now be explained, the image is washed-out, i.e., it has low contrast.

Figure 5:
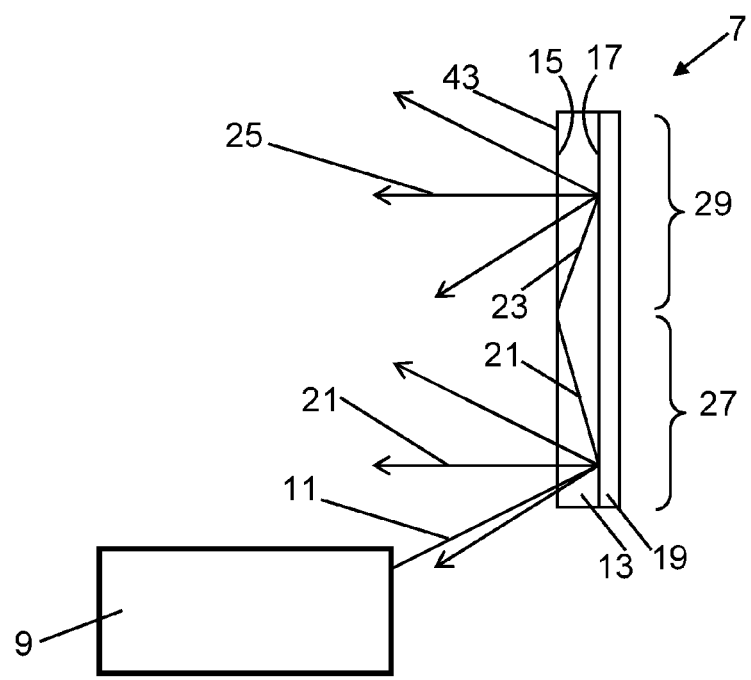
FIG. 5 is a schematic ray trace illustrating the waveguide effect which in accordance with the present disclosure has been discovered to be the source of low contrast of the type illustrated in FIG. 1.

FIG. 5 shows the applicable geometry where the reference number 27 indicates a portion of screen 7 which is to appear illuminated to the user, while reference number 29 indicates a portion that is to appear non-illuminated, i.e., a portion which is to appear black with ideally no light emanating from it.

In this figure, projector 9 transmits image light 11 towards screen 7 which, after passing through glass sheet 13, impinges on diffusing element 19. Diffusing element 19 acts as a nearly Lambertian diffuser and reflects/scatters the incoming light to produce light 21. Some of light 21 passes out of the screen through glass sheet 13 and on to the user, as desired. However, some of light 21 undergoes total internal reflection at the front surface 15 of the glass sheet and remains in the sheet as light 23, i.e., for some of the incoming light that is reflected/scattered by the diffusing element, the glass sheet functions as a waveguide and causes that light to move laterally within the glass sheet. This wave-guided light is re-reflected/re-scattered by diffusing element 19 to produce light 25. To the user, light 25 emanates from portion 29 of the screen 7 which by hypothesis is supposed to appear black. It is this light 25 that reduces the contrast of the screen, i.e., by increasing $I_{min}$ in Eq. (1).

The actual light paths are much more complex than those shown in FIG. 5 and involve multiple reflections (and potentially some scattering) at the front surface of the glass sheet and multiple reflections/scatterings at the diffusing element, as well as reflections (and potentially some scattering) at the back surface 17 of the glass sheet for cases where the index of refraction of the glass sheet differs from that of the diffusing element. It should be noted that if an anti-glare coating is used (see the discussion of FIG. 17 below) and if the anti-glare coating has the same index of refraction as glass sheet 13, then the internal reflection will occur at surface of the anti-glare coating that forms the user-facing surface 43 of the screen rather than at the front surface 15 of the glass sheet. Similarly, when an adhesive layer is used between the glass sheet and the diffusing element (see the discussion of FIG. 14 below), reflections/scattering can occur at the interface between the glass sheet and the adhesive.

Figure 6:
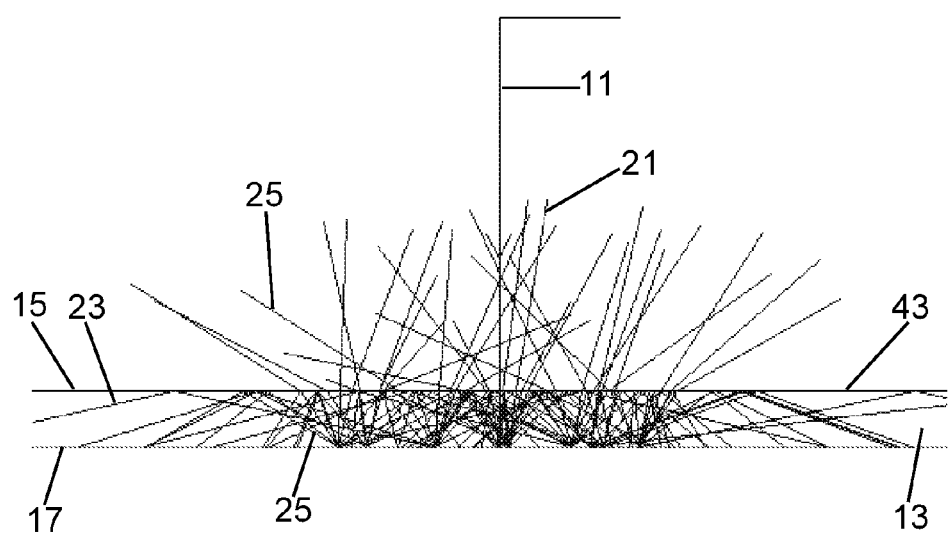
FIG. 6 is a ray trace obtained using ZEMAX further illustrating the waveguide effect. The diffusing element is not shown in this figure.

The effects of the various interfaces making up the projection screen can be analyzed using, for example, commercially available optical design software such as the ZEMAX program sold by Zemax, LLC, Redmond, Wash. FIG. 6 is a ray trace obtained using ZEMAX which further illustrates the waveguide effect shown schematically in FIG. 5. Using ray traces of this type, it has been determined that the waveguide effect can be minimized by reducing the thickness of the glass sheet. Specifically, by reducing the thickness, the wave-guided rays (i.e., the rays that are totally internally reflected and thus do not pass out of the screen after reflection/scattering by the diffusing element) undergo more interactions with the diffusing element per unit length of lateral travel. Each interaction with the diffusing element creates more reflected/scattered light and also reduces the intensity of the wave-guided light through absorption of the light by the diffusing element. As a result of these effects, the light that ultimately leaves the user-facing surface of the screen from parts of the screen that are supposed to appear dark is of lower intensity, thus making $I_{min}$ smaller and C larger, as is desired.

Figure 7:
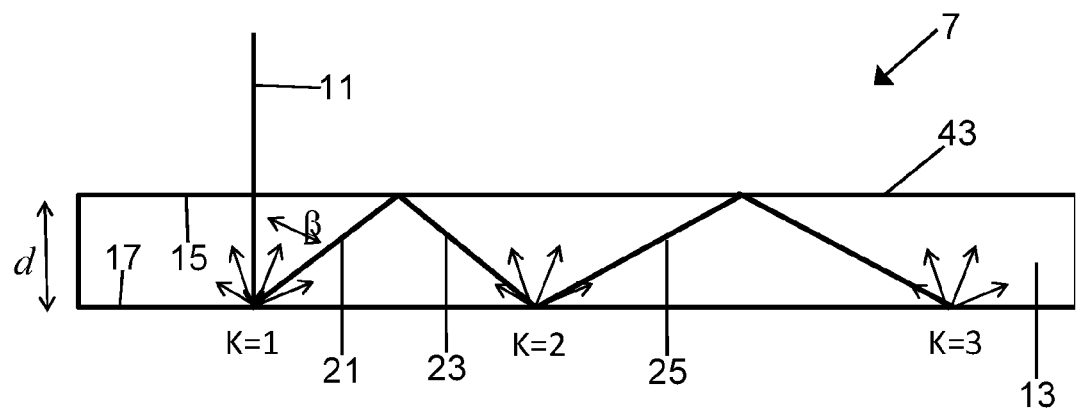
FIG. 7 is a schematic ray trace further illustrating the waveguide effect which in accordance with the present disclosure has been discovered to be the source of low contrast of the type illustrated in FIG. 1. The diffusing element is not shown in this figure.

FIG. 7 further illustrates the mechanism by which this reduction in contrast occurs. Assuming the diffuser is nearly Lambertian, the amount of light X that is trapped in the glass after scattering is given by:

$$X=1-(1/n)^2,$$

where n is the index of refraction of the glass.

With an index close to 1.5, the amount of trapped light is about 55%. That light will propagate and will keep being scattered by the diffuser as it propagates. The amount of light Y that keeps being waveguided after "K" bouncing and scattering events is given by:

$$Y=X^K.$$

So, for instance, about 16.6% of the light is still inside the glass after the three scattering events illustrated in FIG. 7.

The loss of contrast and image resolution is a function of how far from the original impact (K=1) the light can propagate. To make an order of magnitude estimate, one needs to consider that the angle β of propagation is equal or larger than the total internal reflection angle TIR which is given by:

$$TIR=a\ sin(1/n).$$

For an index of 1.5, TIR is equal to about 42 degrees and so, after K bounces, light has at least propagated by a distance D given by:

$$D>2*(K-1)*d*\tan(\beta)$$

where, as above, d is the thickness of the glass.

Considering a thickness of, for example, 3 mm, one can conclude that, after three bounces, where, as calculated above, there is still 16.6% of the energy, light has propagated by at least 10.8 mm or more than a centimeter in all radial directions. To further quantify the impact of the waveguide effect on image contrast, one can use non-sequential ray tracing which can be performed using, for example, the ZEMAX program discussed above.

Figure 8:
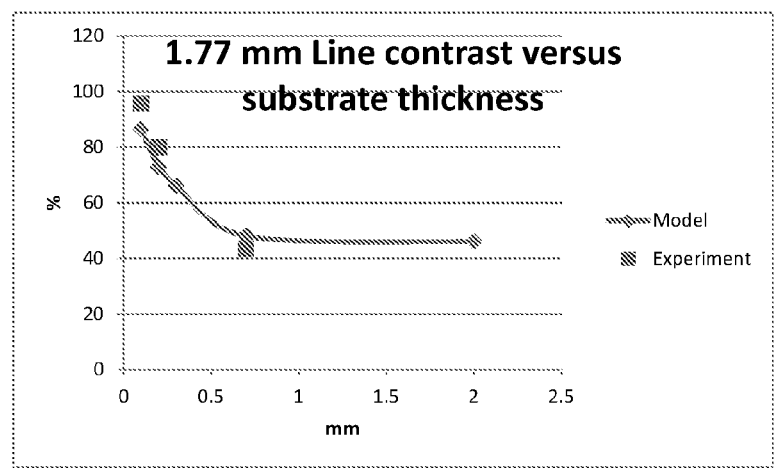
FIG. 8 is a plot of contrast C (vertical axis) versus glass thickness d (horizontal axis). The square data points of this figure are for the experiments of FIGS. 1, 3 and 4. The diamond data points were calculated using ZEMAX ray tracings of the type shown in FIG. 6.

FIG. 8 illustrates the reduction in the waveguide effect with reduced glass thickness. In this figure, the square data points are for the experiments of FIGS. 1, 3 and 4, and the diamond data points were calculated using ZEMAX ray tracings of the type shown in FIG. 6. As shown in FIG. 8, the contrast C improves rapidly as the thickness of the glass sheet is reduced below 0.2 mm. In an embodiment, the contrast C is at least 75% and, as shown in FIG. 8, this level is achieved for a thickness d that is less than or equal to 0.2 mm. In another embodiment, C is at least 95% and, as shown in FIG. 8, this level is achieved for a thickness d that is less than or equal to 0.1 mm. At this contrast level, the image produced by the screen is nearly as good as when projecting on a piece of white printer paper. In addition to improving contrast, the use of glass sheets having a thickness that is less than or equal to 0.2 mm can also lower the overall weight of the projection screen.

To summarize, in accordance with this first aspect of the disclosure, the distance over which wave-guided light is allowed to propagate within a glass sheet is controlled using the thickness of the sheet. Specifically, the number of bounces per millimeter that the wave-guided light experiences is inversely proportional to the thickness of the glass sheet. Since at every bounce light gets scattered again, more bounces mean that the wave-guided light leaks faster from the screen (i.e., the wave-guided light exits the user-facing surface of the screen within a smaller lateral distance) so that less wave-guided light ends up exiting the screen from portions of the screen that are supposed to be dark. In particular, less wave-guided light propagates deep into the dark portions of the image. In this way, at least the central parts of the dark portions of the image remain dark notwithstanding the waveguide effect. The presence of these dark parts causes the user to perceive the image as having a high contrast.

In addition to causing wave-guided light to leave the screen faster, more bounces means that the wave-guided light will have more interactions with the diffusing element per unit length of lateral travel. FIGS. 9-12 illustrate an alternate approach for improving contrast by increasing the diminution in light intensity at each interaction between the wave-guided light and the diffusing element, i.e., by increasing the absorption of light by the diffusing element. This alternate approach can be used alone or, preferably, in combination with the thin glass sheet approach.

Figure 9:
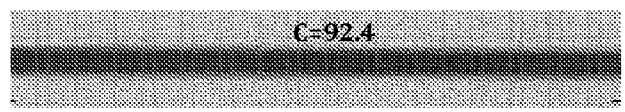
FIGS. 9, 10, and 11 illustrate the effect on contrast of the whiteness W of a diffusing element of a front projection screen.
Figure 10:
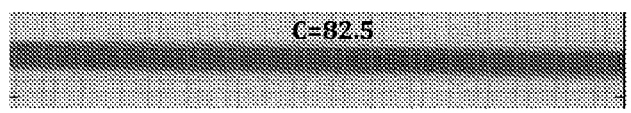
Figure 11:
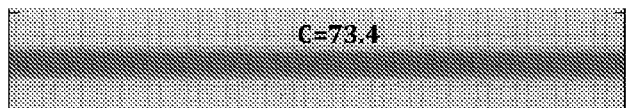

The absorption of the diffusing element can be increased by, for example, using a colored diffusing element, e.g., a diffusing element that is colored grey. FIGS. 9, 10, and 11 show the results of repeating the experiment of FIG. 1, but instead of painting the back surface of the glass sheet white as in FIG. 1, the back surfaces of the glass sheets of FIGS. 9, 10, and 11 were painted with different shades of grey paint. Also, instead of using glass having a thickness of 0.7 mm as in FIG. 1, the glass used in these experiments had a thickness of 1.1 mm. Contrast C and whiteness W values were then obtained using Eqs. (1) and (2) and the contrast and whiteness experimental protocols set forth above. In this way, for FIG. 9, the measured C and W values were 92.4% and 0.17, for FIG. 10, they were 82.5% and 0.3, and for FIG. 11, they were 73.4% and 0.4. As shown in FIG. 8, C values remain substantially constant for glass thicknesses above 0.7 mm and thus the C value for the 1.1 mm glass sheet having white paint on its back surface was again 43.4%, as in FIG. 1; its W value was 1.0.

Figure 12:
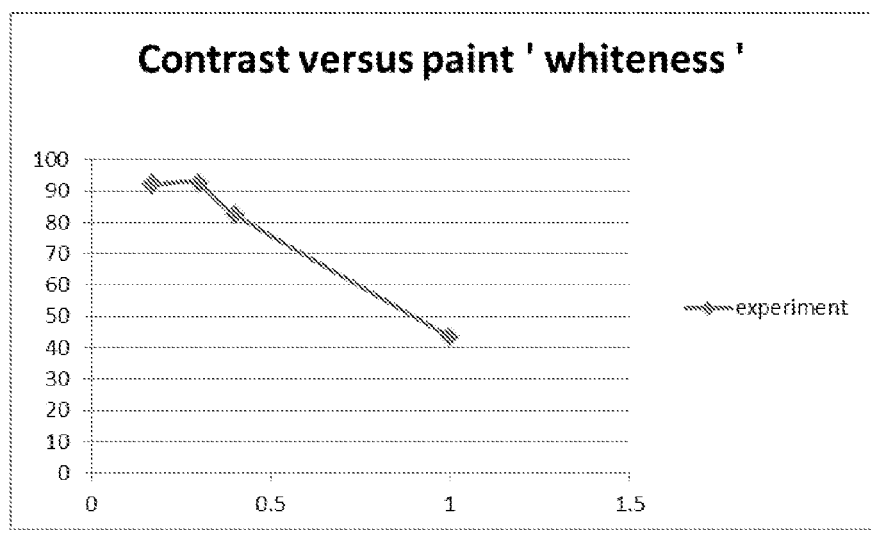
FIG. 12 is a plot of contrast C in percent (vertical axis) versus whiteness W (horizontal axis).

The results of these experiments are summarized in FIG. 12. As can be seen, the contrast improves substantially for W values that are less than or equal to 0.5. Although the diffusing element was made gray in the experiments of FIGS. 9, 10, and 11, other colors can be used if desired. For example, blue can be an effective absorbing color because the sensitivity of the human eye to blue light is lower than its sensitivity to red and green light. Accordingly, by absorbing blue light, the overall reduction in light emitted from the screen as a result of the absorption by the diffusing element is less likely to be bothersome to the user. In this regard, it should be noted that conventional project screens often have W values on the order of 0.3 so that a W value of less than or equal to 0.5 and, in particular, a W value in the 0.3 to 0.5 range, will provide a sufficiently bright image for most applications. Also, because wave-guided light hits the diffusing element many times as it propagates laterally, that light will be attenuated much faster than the image itself. Accordingly, the W value does not have to be far below 0.5 in order to achieve a substantial increase in contrast. As an alternative to using the diffusing element as an absorber, absorption can also be performed within the glass sheet, e.g., by including an absorber such as iron in the glass composition. Combinations of absorption by the glass and by the diffusing element, as well as by other components of the screen, can be used if desired.

Figure 13:
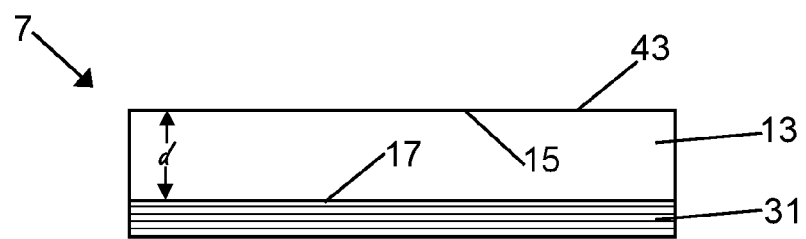
FIG. 13 is a schematic, cross-sectional view of a projection screen constructed in accordance with an embodiment of the disclosure in which a diffusing element is coated on the back surface of a glass sheet.
Figure 14:
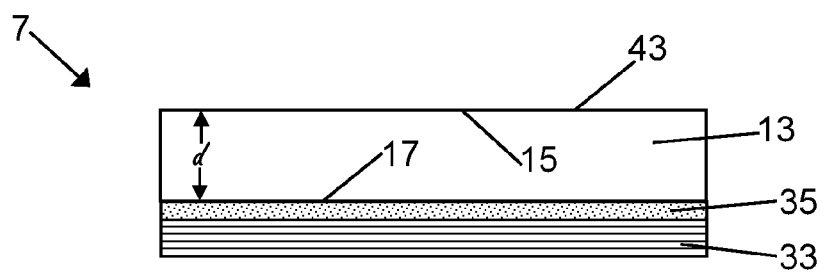
FIG. 14 is a schematic, cross-sectional view of a projection screen constructed in accordance with an embodiment of the disclosure in which a diffusing element is laminated to the back surface of a glass sheet.
Figure 15:
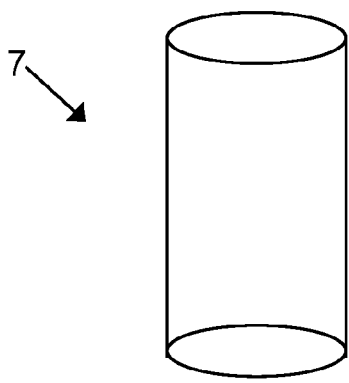
FIG. 15 is a stylized, schematic drawing illustrating a projection screen in a rolled configuration in accordance with an embodiment of the disclosure.

FIGS. 13 and 14 illustrate representative embodiments of high contrast, glass-based, writeable/erasable front projection screens constructed in accordance with the present disclosure. In FIG. 13, diffusing element 31 is in the form of a coating (e.g., a paint or ink) applied directly to the back surface of the glass sheet. The paint or ink (e.g., a white ink)

can be applied by, for example, spray painting or inkjet painting. In FIG. 14, the diffusing element 33 is a sheet of diffusing material (e.g., a sheet of paper) laminated to the back surface of the glass sheet using an adhesive 35 whose optical properties provide optical contact between the diffusing element and the glass sheet, i.e., the adhesive transmits image light to and from the diffusing element. Non-limiting examples of suitable optically clear adhesives include pressure sensitive adhesives and double sided tapes. For these embodiments, especially when the glass sheet has a thickness of, for example, 0.1 mm, the screen can be sufficiently flexible so that it can be rolled upon itself for storage, as illustrated in FIG. 15.

Figure 16:
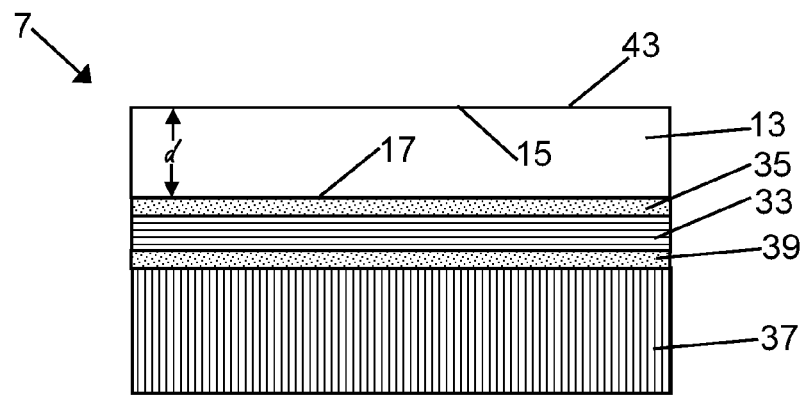
FIG. 16 is a schematic, cross-sectional view of a projection screen constructed in accordance with an embodiment of the disclosure in which a diffusing element is laminated to the back surface of a glass sheet and a backer is laminated to the diffusing element.
Figure 17:
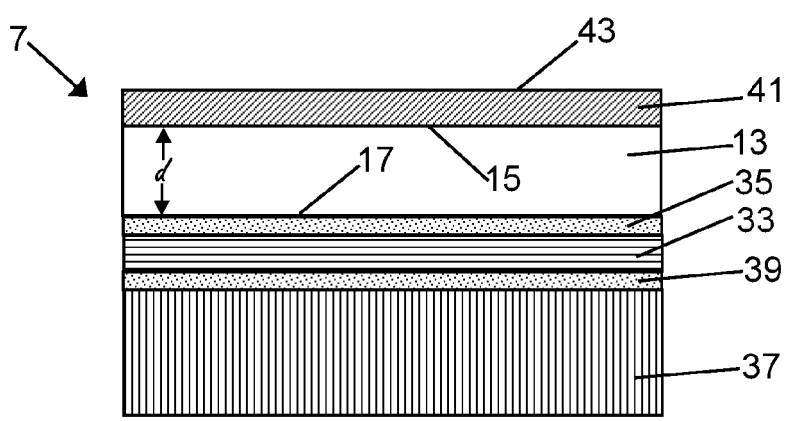
FIG. 17 is a schematic, cross-sectional view of a projection screen constructed in accordance with an embodiment of the disclosure in which a diffusing element is laminated to the back surface of a glass sheet, a backer is laminated to the diffusing element, and an anti-glare element is coated on the front surface of the glass sheet.

FIGS. 16 and 17 illustrate further embodiments in which the screen includes additional optional components. For example, as shown in FIG. 16, the screen can include a backer 37, such as a rigid metal or plastic backer, to improve the strength of the glass sheet. The backer can, for example, be laminated to the back of diffusing element 33 using adhesive 39, which can be the same or different from adhesive 35. Because light does not need to pass through adhesive 39, a broader range of adhesive materials can be used to affix the backer to the diffusing element than are used to affix the diffusing element to the glass sheet. For example, as non-limiting examples, adhesive 39 can be an epoxy adhesive, an acrylic adhesive, or a UV curable adhesive for cases where, for example, the backer transmits UV light.

Alternatively, depending on the materials used, the backer can serve as the diffusing element and can be laminated directly to the glass sheet as in FIG. 13 or can be in optical contact with the glass sheet through the use of an adhesive which provides such contact as in FIG. 14. In addition to a backer, edges and corners of the glass sheet can be protected by, for example, using a frame around the glass or by laminating plastic sheets to the edges of the glass sheet. When the backer is composed of metal, a magnetic metal, i.e., a metal that can be attracted by a magnet, can be chosen so as to allow items, such as trays for markers, to be removably mounted to the screen.

FIG. 17 illustrates an embodiment which includes an anti-glare element 41. For purposes of illustration, element 41 in FIG. 17 is shown as a separate element that has been applied to the front surface 15 of glass sheet 13. Although a separate element can be used if desired, in practice, it is typically more convenient to incorporate the anti-glare element as part of the glass sheet. In either case, the anti-glare element provides the projection screen with anti-glare properties so as to reduce the intensity of the reflected image of the lens of a projector that is created by the user-facing surface of the projection screen.

As a non-limiting example, an anti-glare element 41 which is incorporated as part of glass sheet 13 can be formed by applying to the front surface of the glass sheet a "mask" in which small particles locally adhere to the glass surface. Such a mask can be formed by, for example, painting small dots on the surface of the glass using an inkjet printer. When a glass sheet prepared in this way is dipped into an acid bath (e.g., a HF bath), differential etching will occur between the portions of the sheet covered by the dots and the exposed portions. The result is surface texturing. The depth and size of the roughness thus generated can be controlled based on, for example, the size of the mask particles, how well they adhere to the glass, the etching duration, the acid concentration, and the temperature of the etch bath.

The resulting glass surface can be characterized by: 1) its total RMS roughness (e.g., its total roughness measured using a measuring window of 0.6 mm×0.6 mm with no spatial frequency filtering) and 2) its haze, where haze refers to the percentage of incident light scattered outside an angular cone of ±2.5° as determined using ASTM procedure D1003. In the case of writeable/erasable projection screens, a balance needs to be maintained between the screen's anti-glare properties and its erasability. A total RMS value in the range of 900 nm to 1500 nm for a 0.6 mm×0.6 mm measurement window with no spatial frequency filtering and a haze of at least 10% (preferably, ≥20%) have been found to produce a diffuse image, rather than a bright image, of a projector's projection lens while still providing a user-facing surface for the projection screen that is erasable, i.e., a surface from which writing on the screen can be erased with essentially no visually detectable residue remaining after the erasing. A user-facing surface with these characteristics has also been found to have desirable haptic characteristics, i.e., the surface has been found to be pleasing to the touch. The same surface properties can be employed when the anti-glare properties are provided by a separate element that is affixed (e.g., with an optically clear adhesive) to the front surface of the glass sheet.

Various glass compositions and glass-forming techniques (e.g., the overflow downdraw fusion process or the float process) can be used to construct glass sheet 13. In general terms, the glasses will contain $SiO_2$ and $Al_2O_3$, and, depending on the application, at least two of: $B_2O_3$, MgO, CaO, SrO, BaO, $Na_2O$, $K_2O$, and $Li_2O$. As non-limiting examples, the glass sheets can have compositions of the types disclosed in Dumbaugh, Jr. et al., U.S. Pat. No. 5,374,595; Chacon et al., U.S. Pat. No. 6,319,867; Ellison, U.S. Pat. No. 7,534,734; Danielson et al., U.S. Pat. No. 7,833,919; Ellison, U.S. Pat. No. 7,851,394; Moffatt et al., U.S. Reissue No. RE37,920; and Kohli, U.S. Reissue No. RE41,127; the contents of which are incorporated herein by reference in their entireties. Strengthened glass sheets can also be used, such as glass sheets having compositions of the types disclosed in Dejneka et al., U.S. Pat. No. 8,158,543; Dejneka et al., U.S. Patent Application Publication No. 2011/0045961; and Barefoot et al., U.S. Patent Application Publication No. 2011/0201490; the contents of which are incorporated herein by reference in their entireties. Corning Incorporated's WILLOW® brand glass is particularly well-suited for use as the glass sheets of the projection screens of the present disclosure.

Whatever their composition, the glass sheets need to be sufficiently transparent to allow image light to pass through the sheet, reflect from the diffusing element, and then pass back through the sheet to the user. Quantitatively, over the wavelength range of 450 to 650 nm, the glass sheets should exhibit a transmission of at least 90%.

As to the diffusing element, it will typically function as a Lambertian diffuser and thus will preferably diffuse light in an angle of at least 30 degrees. As an alternative to a Lambertian diffuser, diffusing elements having a directionality can be used if desired. See, for example, Liu et al., U.S. Pat. No. 8,220,932.

In addition to the various components discussed above, the projection screens of the present disclosure can include a variety of other components. For example, the screens can include protective coatings, anti-splinter films, mounting hardware, and the like. Also, if desired, the back surface of the glass sheet can comprise a pattern, e.g., a company logo, that is perceivable by a user through the screen's user-facing surface.

A variety of modifications that do not depart from the scope and spirit of the invention will be evident to persons of ordinary skill in the art from the foregoing disclosure. The following claims are intended to cover the specific embodiments set forth herein as well as modifications, variations, and equivalents of those embodiments.

What is claimed is:

1. A projection screen having a user-facing surface which faces a user during use of the projection screen, said projection screen comprising a transparent glass sheet and a diffusing element wherein:
   (a) the glass sheet has a front surface and a back surface separated by a distance d;
   (b) the back surface of the glass sheet is in optical contact with the diffusing element;
   (c) during use of the projection screen, the front and back surfaces of the glass sheet transmit image light from a projector to the diffusing element and the diffusing element reflects a portion of that light back through the glass sheet to a user;
   (d) the glass sheet is configured to cause the projection screen to have a contrast of at least 75% based at least in part on the distance d being greater than 0.05 millimeters and less than 0.2 millimeters; and
   (e) the user-facing surface of the projection screen is a writable/erasable surface.

2. The projection screen of claim 1 wherein the projection screen has a contrast of at least 95%.

3. The projection screen of claim 1 wherein the distance d is less than or equal to 0.1 millimeters.

4. The projection screen of claim 1 wherein the glass sheet and the diffusing element together provide the projection screen with a whiteness W that is less than or equal to 0.5.

5. The projection screen of claim 1 wherein the diffusing element comprises a coating on the back surface of the glass sheet.

6. The projection screen of claim 5 wherein the coating is white ink.

7. The projection screen of claim 1 wherein the diffusing element comprises a magnetic metal sheet laminated to the back surface of the glass sheet.

8. The projection screen of claim 1 wherein the user-facing surface of the projection screen has anti-glare properties.

9. The projection screen of claim 1 wherein the back surface of the glass sheet comprises a pattern that is perceivable by a user through the screen's user-facing surface.

10. The projection screen of claim 1 rolled upon itself into a storage configuration.

11. An optical system comprising the projection screen of claim 1 and a projector, wherein the projector projects image light toward the user-facing surface of the projection screen.

12. The projection screen of claim 1 wherein the diffusing element comprises a diffusing material laminated to the back surface of the glass sheet.

13. The projection screen of claim 12 wherein the diffusing material comprises paper.

14. The projection screen of claim 12 comprising a backer laminated to the diffusing element.

15. The projection screen of claim 14 wherein the backer comprises a metal backer.

16. The projection screen of claim 14 wherein the backer comprises a plastic backer.

17. The projection screen of claim 1 wherein the user-facing surface of the projection screen has a total RMS roughness of 900 nm to 1500 nm for a 0.6 mm×0.6 mm measurement window with no special frequency filtering.

18. The projection screen of claim 1 wherein the user-facing surface of the projection screen has a haze of at least 10%.

* * * * *